United States Patent [19]

Schudel

[11] Patent Number: 5,574,234

[45] Date of Patent: Nov. 12, 1996

[54] FLOATING-BALL DEVICE FOR PRECISE AXIAL ALIGNMENT BETWEEN OPPOSING STRUCTURES

[75] Inventor: Dale F. Schudel, Ayutthaya, Thailand

[73] Assignee: K. R. Precision Co., Ltd., Ayutthaya, Thailand

[21] Appl. No.: 431,971

[22] Filed: May 1, 1995

[51] Int. Cl.$^6$ ................................................ G01N 19/00
[52] U.S. Cl. ................................................ 73/865.9; 73/760
[58] Field of Search ................................ 73/760, 865.9; 33/533; 360/104, 109, 31

[56] References Cited

U.S. PATENT DOCUMENTS

| | | | |
|---|---|---|---|
| 1,309,217 | 7/1919 | Ratheram . | |
| 2,240,047 | 4/1941 | Marzoli | 57/129 |
| 2,411,621 | 11/1946 | Grubbs | 82/45 |
| 4,795,286 | 1/1989 | Shimoishi et al. | 401/209 |
| 4,842,433 | 6/1989 | Otsuka | 401/209 |
| 5,079,660 | 1/1992 | Yumura et al. | 360/104 |
| 5,153,794 | 10/1992 | Hinlein | 360/104 |

*Primary Examiner*—Richard Chilcot
*Assistant Examiner*—Max H. Noori
*Attorney, Agent, or Firm*—Antonio R. Durando

[57] ABSTRACT

A floating-ball/tooling-hole coupler that is adapted to provide a precise alignment between a testing tool and a receiving tooling hole in a disk-drive suspension assembly. The ball is housed in a precision-tapered conical structure with a back plate through which the tool's load is exerted. A conforming tooling hole is formed centered at a desired testing point along the longitudinal axis of the suspension, thus providing a precise point of connection between the two. As the tool begins pushing against the assembly to impart a load, the ball floats within a predetermined degree of freedom and is captured by the tooling hole to obtain alignment therewith, which causes the force exerted by the back plate to be transferred to the tooling hole in perfect alignment with the desired testing point.

20 Claims, 4 Drawing Sheets

FLOATING-BALL DEVICE FOR PRECISE AXIAL ALIGNMENT BETWEEN OPPOSING STRUCTURES

BACKGROUND OF THE INVENTION

1. Field of the Invention

This invention is related in general to apparatus for aligning two working structures along a desired alignment axis. In particular, it consists of a floating-ball connection for precisely coupling a magnetic head suspension assembly and a testing tool in perfect alignment during the assembly manufacturing process.

2. Description of the Related Art

The magnetic head slider of a magnetic disk system operates by floating in very close proximity over the surface of the magnetic disk, thereby accurately reading and writing data thereon. While the magnetic head slider is floating disposed substantially in parallel over the disk during operation, it must be able to adjust its attitude to conform to magnetic-disk surface imperfections and dynamic displacements, such as surface vibrations generated by the rotating movement. Therefore, the torsional characteristics of the suspension supporting the slider are critical to the proper functioning of the apparatus and must be maintained within prescribed design specifications to prevent contact with the disk surface and avoid the disabling consequences that normally result therefrom.

For illustration, FIG. 1A shows in perspective view a conventional magnetic head gimbal assembly 2 (HGA) positioned over a magnetic disk 4. The head gimbal assembly 2 consists of a slider 6 mounted on a gimbal 8 which is either integral with or rigidly connected to a load beam 10 that comprises a pre-load region 12 and formed rails 22 that provide rigidity to the assembly. The combined gimbal and load beam, which constitute the suspension 11, support the slider portion of the head gimbal assembly. The suspension is in turn attached to a driving mechanism (not shown) by means of a screw or swage mount 14. In operation, the head gimbal assembly 2 is moved by the driving mechanism along the radius of the magnetic disk 4 (arrows A1) so that the slider 6 may be placed rapidly over the appropriate read/write tracks in circumferential direction with respect thereto as the disk is rotated in the direction of arrow A2.

For ease of description, the radial, tangential and vertical directions with respect to the surface of disk 4 are referenced in the figures by x, y and z coordinates, respectively. Thus, the magnetic head slider 6 is supported by the gimbal 8 for controlling pitching and rolling movements as the slider's position changes in the radial (x axis) and circumferential (y axis) directions of the magnetic disk 4. When the magnetic disk is rotated, an air spring is created by the air flowing between the surface of the disk and the rails 16 in the magnetic head slider 6, and the torsional characteristics (roll) of the suspension 11 must be such that the slider maintains its dynamic attitude through surface imperfections and vibrations of the rotating disk.

As magnetic recording technologies evolve, progressive miniaturization of head gimbal assembly components creates critical challenges. One is the tolerance control on the static attitude parameters of the suspension 11 as the slider size is reduced. As the slider 6 becomes smaller, the narrower width between its rails results in smaller differential pressure profiles that produce head gimbal assemblies having flying roll characteristics closely correlated to their static roll attributes. Accordingly, flying attitude characteristics may be predicted well by testing the static attitude of the suspensions under controlled conditions.

Thus, in order to ensure the desired dynamic performance of the suspension (pitch, roll and resonance characteristics), each component of the assembly is manufactured according to specific design specifications and is bench tested for predetermined static parameters. The static attitude of each suspension is measured and compared to allowable tolerances. FIG. 1B illustrates in exploded perspective view the essential portions of conventional prior-art magnetic-head supporting apparatus. The slider 6, to which a magnetic head is mounted (not shown), is attached to a gimbal tongue 42 of the gimbal 8, while the load beam 10 is attached to the outer frame of the gimbal 8 by means of weld points or taps 44. The tongue 42 has a preformed angle and twist and comprises a convex dimple 46 adapted to pivot freely in a concave notch 48 in the load beam 10. Thus, as the magnetic head floats during operation, the dimple 46 pivots freely at the point of contact with the notch 48 in the pitch and roll moments of rotation.

As illustrated in FIG. 2, the static attitude is measured at the mounting surface of the gimbal tongue 42 under load to approximate its flying attitude in the disk drive. The suspension 11 is subjected to a predetermined load at a point along its longitudinal axis and appropriate static measurements are made. Since the components of the suspension consist of very thin stainless-steel structures with extremely low pitch and roll stiffnesses (typically with spring rates in the order of 2 to 10 micro-Joules/degree), a perfect alignment of the axis of the suspension with the testing tool is essential to avoid the introduction of artificial lateral distortions during testing. If the point of contact of the testing tool (that is, the point where the tool pushes against the assembly to impart a load) does not coincide with the suspension's longitudinal axis, a torsional force is introduced that distorts the results. Accordingly, it is very important that such a point of contact with the tool's probe lie on the longitudinal axis of the suspension. This is often difficult to achieve even with very precise instrumentation because of the several components whose cumulative tolerances contribute to the final alignment. Therefore, there exists a need for an improved method of aligning a testing tool with a disk-drive suspension for imparting a test load during the manufacturing process.

BRIEF SUMMARY OF THE INVENTION

One primary objective of this invention is a mechanism that ensures the perfect alignment along a predetermined alignment axis of two working components being subjected to a pressure contact.

A more specific goal of the invention is a mechanism and related method of use for ensuring the perfect alignment of a load-imparting tool with the longitudinal axis of a disk-drive suspension for attitude testing during the process of manufacture of the assembly.

Another goal is a mechanism that is suitable for automated utilization in conventional testing equipment.

Finally, an objective of this invention is a device that can be manufactured in an economical and commercially viable manner utilizing components that are either already available or can be constructed at reasonable cost.

Therefore, according to these and other objectives, the present invention consists of a floating-ball/tooling-hole coupler adapted to provide a precise alignment between a testing tool and a receiving tooling hole in a disk-drive suspension. The ball is housed in a precision-tapered conical structure with a back plate through which the tool's load is exerted. A conforming tooling hole is formed centered at a desired testing point along the longitudinal axis of the suspension, thus providing a precise point of connection between the two. As the tool begins pushing against the assembly to impart a load, the ball floats within a predetermined degree of freedom and is captured by the tooling hole to obtain alignment therewith, which causes the force exerted by the back plate to be transferred to the tooling hole in perfect alignment with the desired testing point.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENT OF THE INVENTION

The main inventive concept of this disclosure consists of a floating-ball coupler that provides a simple means for ensuring perfect alignment between two separate components required to transmit a force between each other along a predetermined line of action. The principle of the invention is described with reference to a test tool for imparting a load to a disk-drive suspension under fixed test conditions, but the specific mechanism of the invention has much broader application and can be utilized in any situation where two separate components need to be aligned precisely along a predetermined point of reference.

Figure 1A:
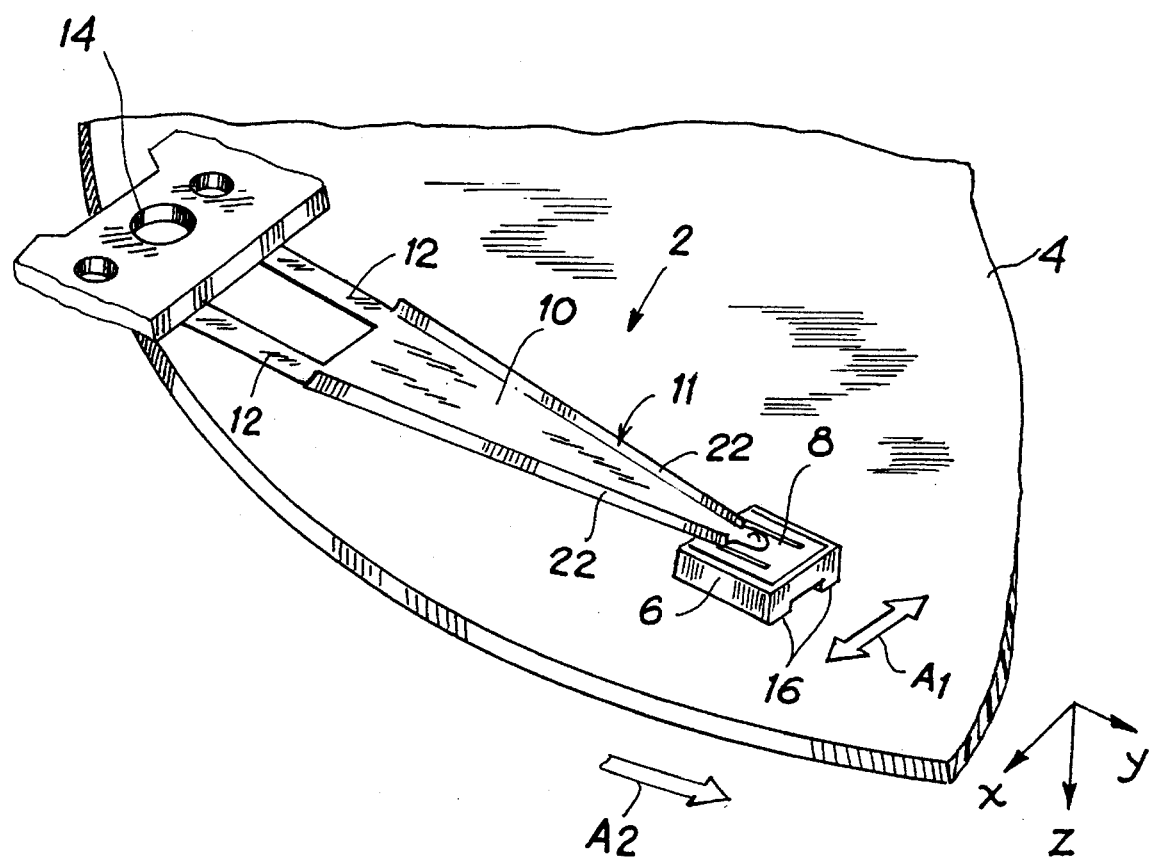
FIG. 1A is a simplified schematic representation of a conventional head gimbal assembly operating on a magnetic disk.
Figure 1B:
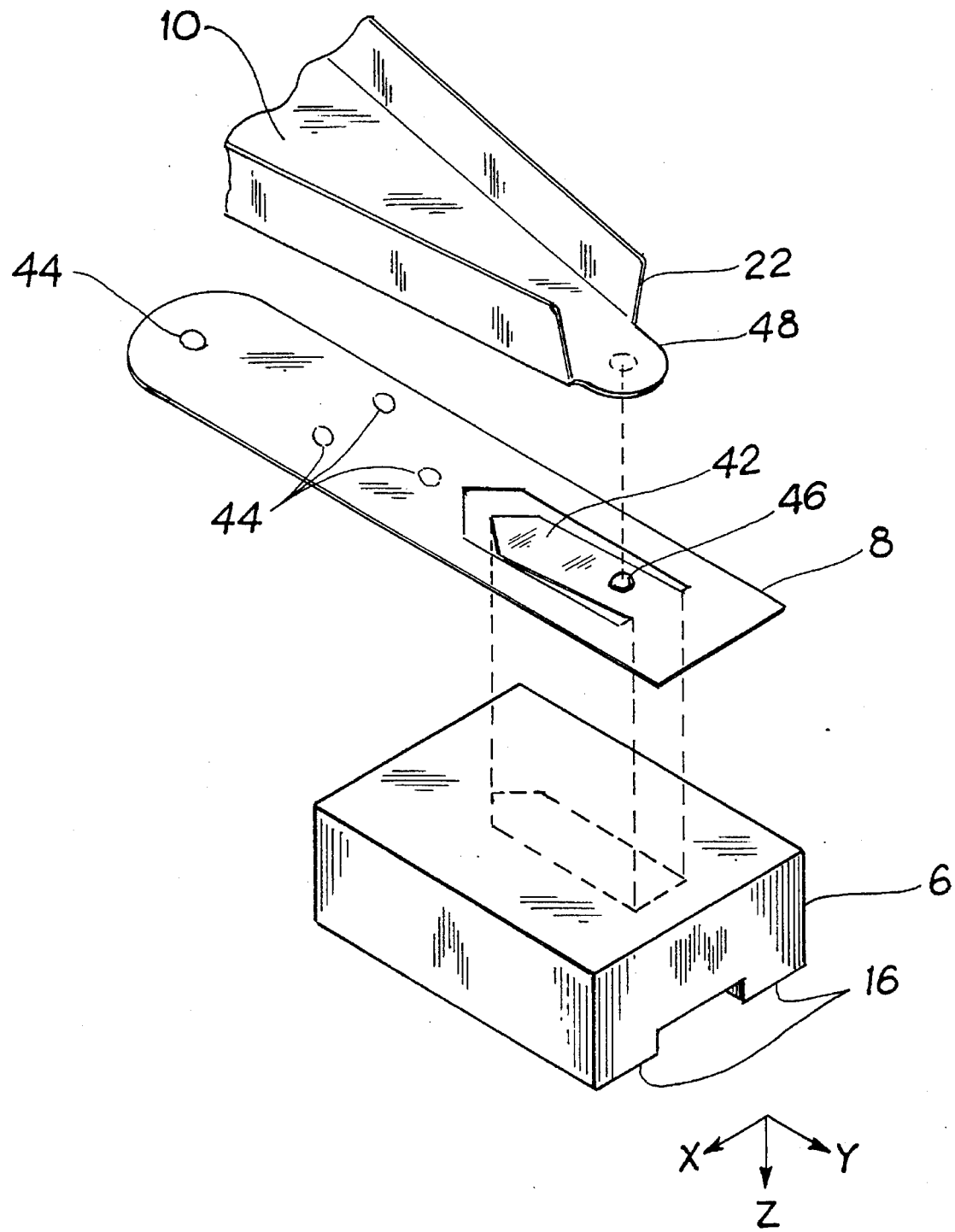
FIG. 1B is an exploded perspective view of the various components of conventional prior-art magnetic-head supporting apparatus.
Figure 2:
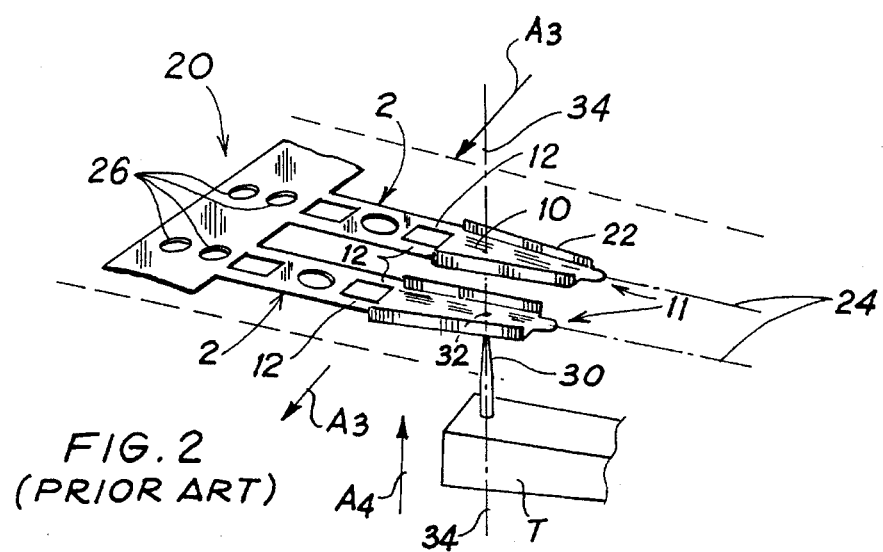
FIG. 2 is a schematic illustration of a test tool operating on a fret of suspensions by sequentially imparting a predetermined load on a precise point of contact along the longitudinal axis of each suspension.

Referring to the drawings, wherein like parts are designated throughout with like numerals and symbols, FIG. 2 illustrates in schematic perspective view a typical test tool T operating sequentially on a fret 20 of suspensions 11 produced by conventional photo-etching, forming and laser-welding processes. The tool T operates on each suspension 11 sequentially as the fret 20 moves along the assembly line in a direction such as indicated by arrows A3 and periodically matches the position of each suspension 11 to the tool T. Each suspension consists of a metal portion that is formed from a very thin (in the order of 0.05 mm) metal sheet of homogeneous physical structure, thereby producing suspensions and load beams expected to have uniform torsional characteristics. The suspensions are strategically punched or etched to produce desired dynamic responses to forces that cause flexure, and rigid structural rails 22 are typically formed in the suspension to provide support according to predetermined design criteria. The pre-load region 12 is normally bent to provide a built-in angle toward the disk surface before engagement with the disk 4 (a 13-degree bend is typical). When in use, the suspension is typically displaced to a condition approaching zero-degree deflection. This deflection creates a force against the slider 6 of the assembly that keeps the slider at the desired nominal flying height during operation (see FIG. 1A).

A critical test during the process of manufacture concerns the attitude of the suspension 11 under loaded conditions. For that purpose, the testing tool T is adapted to move along an alignment axis 34 orthogonal to the plane of the suspension 11 and press against a predetermined contact or datum point 32 lying on the axis 34 and on the longitudinal axis 24 of the suspension 11 to impart a test load (typically between 3 and 7 grams) along the alignment axis 34 passing though the datum point 32. This test simulates the working conditions present when the slider 6 is floating over the surface of the disk 4 (see FIG. 1A). As well understood by those skilled in the art, tooling holes 26 are provided in the fret 20 for alignment of the suspension 11 during testing and various other phases of production. During this testing phase, the tip 28 of a probe 30 in the test tool T is moved upward (arrow A4), ideally along the axis 34, to exert upward pressure against the suspension 11 through the contact point 32, as illustrated in the side view of FIG. 3. The tool T is aligned with the desired contact point 32 on the longitudinal axis 24 by centering the tip 28 on the axis 34 (which is perpendicular to axis 24). If alignment of the suspension 11 is not nearly perfect, such as may occur as a result of slack in the fit of the tooling holes 26 with corresponding positioning pins in the testing apparatus (not shown in the figures), the tip 28 may miss the situs of the desired datum point 32, causing contact to occur at a point likely to be offset from the alignment axis 34 and the longitudinal axis 24, as illustrated in FIG. 4. This results in a torsional moment being imparted to the suspension 11, which in turn affects the static attitude measurements for the suspension under load.

Figure 3:
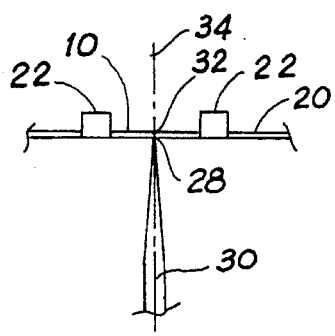
FIG. 3 is a front view of the test-tool probe of FIG. 2 illustrating a precise contact between the tool tip and the intended datum point on the assembly.
Figure 4:
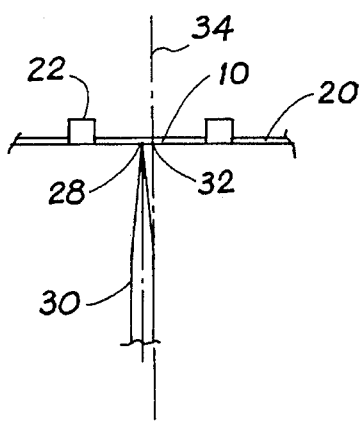
FIG. 4 is a front view of the test-tool probe of FIG. 3 illustrating a lateral offset between the contact point of the tool tip and the intended datum point on the assembly.

It is noted that the tool T is shown in FIGS. 2–4 operating in a vertical direction pushing upward against a downward-disposed suspension assembly. In practice, the effect of gravity is negligible during testing and working conditions of suspension assemblies, which are normally adapted to operate both on the top and bottom surfaces of hard disks.

Therefore, the illustrations of these figures would be equivalently valid if turned upside down. On the other hand, the mechanism of the present invention is affected by gravity, although not critically, and is preferably utilized pushing downward against an upward-disposed suspension assembly. Therefore, the invention is so described below.

Figure 6:
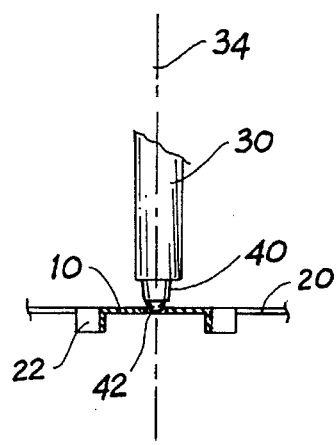
FIG. 6 is a partial cross-sectional view of the test-tool probe of FIG. 5 as seen from line 6—6 in that figure.
Figure 5:
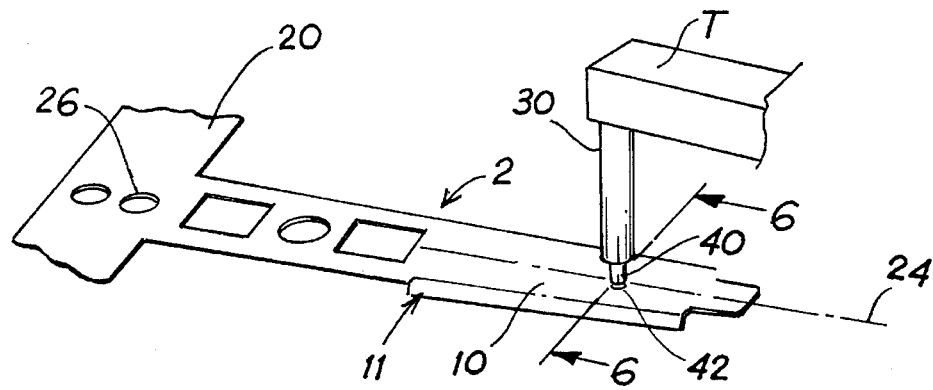
FIG. 5 is simplified perspective illustration of a test tool equipped with the floating-ball coupler of the invention operating on a suspension.

As illustrated in schematic perspective view in FIG. 5, the invention combines a floating-ball coupler 40 at the tip of the probe 30 in the test tool T with a circular tooling hole or opening 42 in the suspension 11 that becomes the datum point of contact for loading the suspension 11. The test tooling hole 42 is provided along the longitudinal axis 24 of each suspension during manufacture to establish the desired effective point of contact with the probe 30 of the test tool T. This combination of components is illustrated schematically in the cross-section of FIG. 6, where the suspension 11 is shown upside down (with respect to FIGS. 2 and 3) and the probe 30 is shown operating downward. In order to ensure the desired alignment, obviously the tooling hole 42 must be disposed with its center in alignment with the suspension's longitudinal axis 24 (see FIG. 5).

Figures 7, 8:
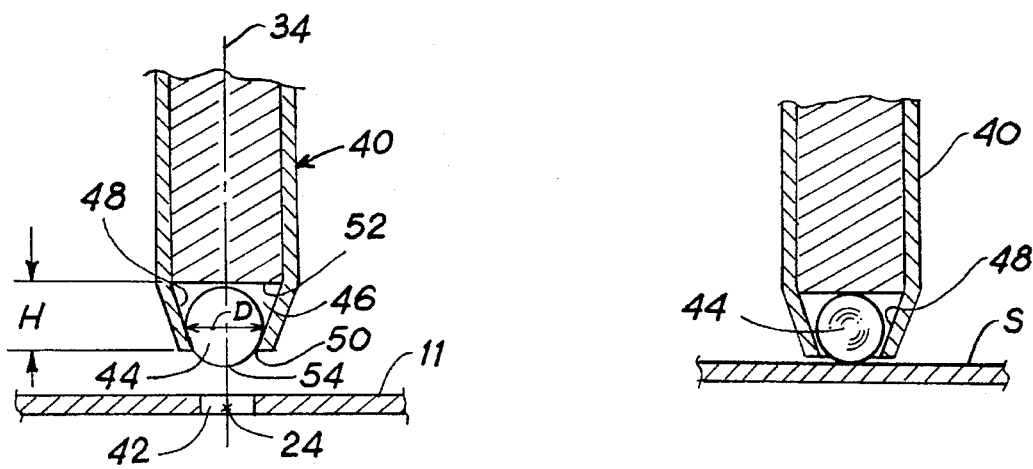
FIG. 7 is an enlarged schematic representation of the floating-ball/tooling-hole combination that constitutes the coupling mechanism of the present invention.
FIG. 8 illustrates the movement of the ball in the floating-ball coupler of the invention when it is pressed against a solid surface.

FIG. 7 is an enlarged schematic view of the floating-ball coupler 40 and tooling hole 42 in the suspension to illustrate the critical components of the invention. The coupler 40 consists of a spherical rigid ball 44 enclosed in a rigid housing 46 having a precision-tapered inside wall 48 with an upside-down truncated-cone geometry converging to a perfectly-circular lower rim 50. The housing 46 is adapted to contain the ball 44 in free-floating fashion between a lower position, where the ball rests on the rim 50 of the housing, and an upper position, where the ball is in contact with a flat upper back plate 52 parallel to the rim 50. In order to ensure the retention of the ball 44 inside the housing 46, the diameter of the rim 50 must be smaller than the diameter of the ball 44, preferably such that, in its lower position, nearly half of the ball extends outside the rim. In addition, the height H of the housing 46 (that is, the vertical distance between the back plate 52 and the rim 50) must be sufficient to allow vertical movement of the ball 44, but not greater than the diameter D of the ball, thus ensuring that the lowest tip 54 of the ball extends outside the rim 50 even when the ball is in contact with the back plate 52. These features are seen in FIG. 8, where the coupler 40 is shown resting on a solid surface S (without a tooling hole) for simplicity of illustration. As the ball 44 is pushed upwards by the supporting surface S, it is clear that the tapered configuration of the housing allows the ball to move laterally as well as vertically, the degree of lateral freedom of movement being determined by the slope of the inside wall 48. Obviously, a greater slope will provide more lateral room for a given vertical displacement of the ball 44.

Figures 9, 11:
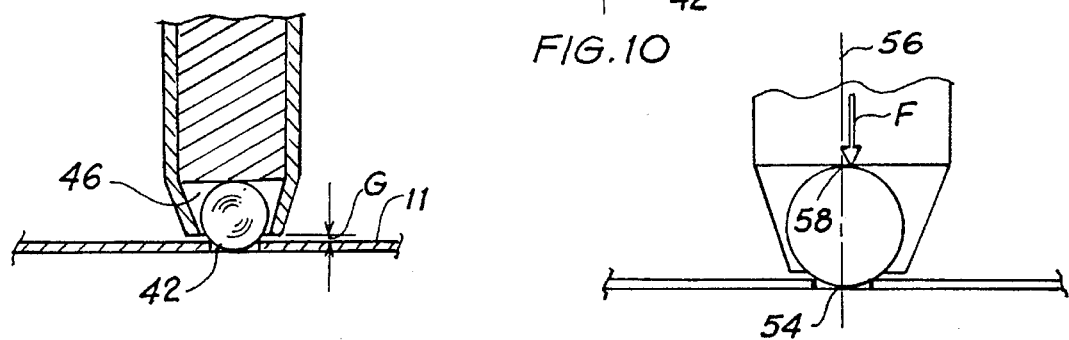
FIG. 9 illustrates the floating-ball coupler of FIG. 7 after engagement with the target tooling hole in a suspension.

When the floating-ball coupler 40 of the invention is combined with a tooling hole in a receiving surface to be engaged by the ball 44, such as hole 42 in the disk-drive suspension 11, it is possible to impart a force exactly through the center of the tooling hole even if the tool T (and therefore also the back plate 52 of the coupler 40) is not exactly centered. So long as the center of the tooling hole 42 is positioned under the coupler 40 within a distance from the vertical axis 34 of the coupler not greater than the degree of lateral freedom of the ball 44 as it floats within the housing 46, perfect alignment is ensured by the engagement of the ball 44 in the hole 42 and the corresponding lateral translation of the ball before contact is made with the back plate 46. This result is illustrated in FIG. 9. Of course, care must be taken to size the floating-ball coupler 40 and the corresponding tooling hole 42 so as to have a gap G between the bottom of the housing 46 and the tooling hole's surface when the floating ball 44 is fully retracted. Otherwise, the two will bind and prevent the ball 44 from floating into perfect alignment with the tooling hole.

Figure 10:
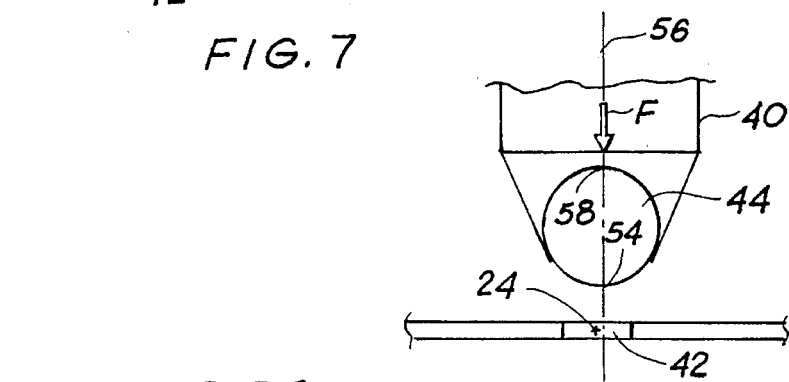
FIGS. 10 and 11 are schematic illustrations of the working principle of the floating-ball/tooling-hole combination concept of the invention.

With specific reference to a disk-drive suspension application, the schematic drawings of FIGS. 10 and 11 illustrate the operating principle of the invention in yielding perfect alignment between the center of the tooling hole 42, which, as described, lies on the suspension's longitudinal axis 24, and the line of action 56 of a downward force F transmitted by the tool T and coupler 40 in a direction normal to the suspension in order to simulate load conditions. Because the force F is exerted by the back plate 46 through a single contact point 58 at the top of the ball, the line of action 56 of the force necessarily passes through the center and the bottom tip 54 of the ball 44. Therefore, perfect alignment of the line of action 56 of the force F with the center of the tooling hole 42 is assured whenever the bottom tip 54 of the ball 44 is itself aligned with the center of the tooling hole, as illustrated in FIG. 11.

If the initial positioning of the suspension 11 is slightly off (that is, if the line of action 56 of the force F does not pass through the center of the tooling hole 42), as seen in FIG. 10, engagement of the ball 44 by the hole 42 will cause the ball to center itself in the hole as the coupler 40 moves downward. Once so placed, as shown in FIG. 11, the line of action 56 of the force F transmitted through the ball 44 is automatically shifted to coincide with the center of the tooling hole 42. Thus, perfect alignment is guaranteed so long as the initial placement is within the floating range of the ball 44.

For the suspension-assembly application described herein, a suspension tooling hole and a ball having diameters approximately 0.8 mm and 1.5 mm, respectively, and a tapered counter bore adapted to provide a vertical ball displacement of about 0.1 mm and a radial translational freedom of approximately 0.075 mm (i.e., a total radial translation of 0.15 mm side to side) were found to be adequate to meet the positioning tolerances of standard testing equipment for suspension assemblies. These parameters are achieved with a housing having a height H of about 1.2 mm, a taper with an angle of approximately 55 degrees with respect to the main axis of the housing, and a bottom rim with a diameter of about 1.4 mm. In general, any set of sizes proportional to the ones described (that is, a housing-height to ball-diameter ratio of approximately 1.2/1.5, a rim to ball-diameter ratio of about 1.4/1.5, and a taper angle of about 55 degrees) will yield a coupling device capable of aligning two structures within a total radial translational freedom of approximately 1/10 the diameter of the ball. Obviously, all components must be manufactured with extreme precision in all cases.

In operation, the test tool is positioned as close as possible to the target location (directly over the tooling hole) by means of a multi-axis control stage and locked in place. Once so centered, the floating ball, in a lowered position from gravitational effects, comes into contact with and is engaged by the tooling hole as the tool moves downward to load the suspension. Before the floating ball is locked in place against the back plate of the coupler, it freely adjusts its position to fit within the tooling hole, thereby aligning the force of action of the tool with the center of the tooling hole.

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. A coupling device for ensuring a precise alignment between a first structure and a second structure along a predetermined alignment axis, wherein the first structure is adapted to exert a force against the second structure, said coupling device comprising:

(a) a housing attached to said first structure and having an interior surface defined by a flat top plate and a tapered wall with an upside-down truncated-cone shape converging to a bottom circular rim of a predetermined diameter, said housing having a main axis parallel to said predetermined alignment axis, and said top plate and bottom circular rim being disposed in parallel to one another at a predetermined distance and perpendicularly to the main axis of the housing;

(b) a spherical ball enclosed in said housing between said top plate and bottom circular rim, said spherical ball having a diameter larger than said predetermined diameter of the bottom circular rim and larger than said predetermined distance; and (c) a circular opening formed in said second structure, said circular opening being perpendicular to said predetermined alignment axis, having a diameter smaller than said predetermined diameter of the bottom circular rim, and having a center disposed on said predetermined alignment axis;

wherein said predetermined distance between the top plate and the bottom circular rim is sufficiently large to allow a vertical movement of the spherical ball, whereby the spherical ball is also free to move laterally within a predetermined radius.

2. The device recited in claim 1, wherein said second structure is a disk-drive suspension assembly and said first structure is an instrument for imparting a test load to said disk-drive suspension assembly.

3. The device recited in claim 2, wherein said circular opening formed in said second structure is a tooling hole centered along a main axis of the suspension.

4. The device recited in claim 1, wherein said predetermined distance between the top plate and the bottom circular rim and said diameter of the spherical ball are in a ratio of approximately 1.2/1.5; and wherein said predetermined diameter of the bottom circular rim and said diameter of the spherical ball are in a ratio about 1.4/1.5.

5. The device recited in claim 2, wherein said predetermined distance between the top plate and the bottom circular rim and said diameter of the spherical ball are in a ratio of approximately 1.2/1.5; and wherein said predetermined diameter of the bottom circular rim and said diameter of the spherical ball are in a ratio about 1.4/1.5.

6. The device recited in claim 5, wherein said predetermined distance between the top plate and the bottom circular rim is about 1.2 mm, said spherical ball has a diameter of about 1.5 mm, and said predetermined diameter of the bottom circular rim is about 1.4 mm.

7. The device recited in claim 6, wherein said tapered wall has a taper of approximately 55 degrees and said circular opening formed in said second structure has a diameter of approximately 0.8 mm.

8. The device recited in claim 2, wherein said tapered wall is adapted to produce a total radial translational freedom of approximately 1/10 the diameter of said spherical ball.

9. The device recited in claim 6, wherein said tapered wall is adapted to produce a total radial translational freedom of approximately 0.15 mm.

10. The device recited in claim 6, wherein said tapered wall is adapted to produce a vertical displacement of about 0.1 mm and a total radial translational freedom of approximately 0.15 mm.

11. A method for coupling a first structure and a second structure along a predetermined alignment axis, the first structure being adapted to exert a force against the second structure, comprising the following steps:

(a) providing a floating-ball coupler consisting of:

a housing attached to said first structure and having an interior surface defined by a flat top plate and a tapered wall with an upside-down truncated-cone shape converging to a bottom circular rim of a predetermined diameter, said housing having a main axis parallel to said predetermined alignment axis, and said top plate and bottom circular rim being disposed in parallel to one another at a predetermined distance and perpendicularly to the main axis of the housing; and a spherical ball enclosed in said housing between said top plate and bottom circular rim, said spherical ball having a diameter larger than said predetermined diameter of the bottom circular rim and larger than said predetermined distance;

wherein said predetermined distance between the top plate and the bottom circular rim is sufficiently large to allow a vertical movement of the spherical ball, whereby the spherical ball is also free to move laterally within a predetermined radius;

(b) providing a circular opening formed in said second structure, said circular opening being perpendicular to said predetermined alignment axis, having a diameter smaller than said predetermined diameter of the bottom circular rim, and having a center disposed on said predetermined alignment axis;

(c) aligning said main axis of the housing in parallel to said predetermined alignment axis and within a distance therefrom not larger than said predetermined radius; and (d) lowering said floating-ball coupler over said circular opening to cause said spherical ball to be captured by the circular opening and be fitted within it so as to transfer the force exerted by said first structure against said second structure in perfect alignment with said predetermined alignment axis.

12. The method recited in claim 11, wherein said second structure is a disk-drive suspension assembly and said first structure is an instrument for imparting a test load to said disk-drive suspension assembly.

13. The method recited in claim 12, wherein said circular opening formed in said second structure is a tooling hole centered along a main axis of the suspension.

14. The method recited in claim 11, wherein said predetermined distance between the top plate and the bottom circular rim and said diameter of the spherical ball are in a ratio of approximately 1.2/1.5; and wherein said predetermined diameter of the bottom circular rim and said diameter of the spherical ball are in a ratio about 1.4/1.5.

15. The method recited in claim 12, wherein said predetermined distance between the top plate and the bottom circular rim and said diameter of the spherical ball are in a ratio of approximately 1.2/1.5; and wherein said predetermined diameter of the bottom circular rim and said diameter of the spherical ball are in a ratio about 1.4/1.5.

16. The method recited in claim 15, wherein said predetermined distance between the top plate and the bottom circular rim is about 1.2 mm, said spherical ball has a diameter of about 1.5 mm, and said predetermined diameter of the bottom circular rim is about 1.4 mm.

17. The method recited in claim 16, wherein said tapered wall has a taper of approximately 55 degrees and said circular opening formed in said second structure has a diameter of approximately 0.8 mm.

18. The method recited in claim 12, wherein said tapered wall is adapted to produce a total radial translational freedom of approximately 1/10 the diameter of said spherical ball.

19. The method recited in claim 16, wherein said tapered wall is adapted to produce a total radial translational freedom of approximately 0.15 mm.

20. The device recited in claim 16, wherein said tapered wall is adapted to produce a vertical displacement of about 0.1 mm and a total radial translational freedom of approximately 0.15 mm.

* * * * *